(12) United States Patent
Kouno et al.

(10) Patent No.: US 9,132,554 B2
(45) Date of Patent: Sep. 15, 2015

(54) ROBOT SYSTEM AND METHOD FOR PRODUCING TO-BE-PROCESSED MATERIAL

(71) Applicant: KABUSHIKI KAISHA YASKAWA DENKI, Kitakyushu-shi (JP)

(72) Inventors: Dai Kouno, Kitakyushu (JP); Tamio Nakamura, Kitakyushu (JP); Tetsuro Izumi, Kitakyushu (JP); Ryoichi Nagai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/191,427

(22) Filed: Feb. 27, 2014

(65) Prior Publication Data

US 2014/0277733 A1    Sep. 18, 2014

(30) Foreign Application Priority Data

Mar. 15, 2013    (JP) .................................. 2013-053291

(51) Int. Cl.
| | | |
|---|---|---|
| B25J 19/00 | (2006.01) | |
| B25J 15/00 | (2006.01) | |
| B25J 15/08 | (2006.01) | |
| B25J 9/16 | (2006.01) | |
| H05B 33/08 | (2006.01) | |

(52) U.S. Cl.
CPC ........... B25J 9/1697 (2013.01); H05B 33/0854 (2013.01); *G05B 2219/37009* (2013.01); *G05B 2219/37151* (2013.01); *Y10S 901/47* (2013.01)

(58) Field of Classification Search
USPC .......................... 700/259, 258, 245; 356/376; 350/559.22; 382/145, 154; 209/542, 209/922; 198/400; 901/46, 47, 31, 9, 30, 901/32, 33, 36, 38; 294/213
See application file for complete search history.

(56) References Cited

U.S. PATENT DOCUMENTS

| | | | |
|---|---|---|---|
| 4,613,269 A | 9/1986 | Wilder et al. | |
| 4,979,135 A | 12/1990 | Moy | |
| 5,479,252 A * | 12/1995 | Worster et al. | 356/237.5 |

(Continued)

FOREIGN PATENT DOCUMENTS

| | | |
|---|---|---|
| JP | 2006-021300 | 1/2006 |
| JP | 2010-078355 | 4/2010 |

(Continued)

OTHER PUBLICATIONS

Japanese Office Action for corresponding JP Application No. 2013-053291, Sep. 30, 2014.

(Continued)

*Primary Examiner* — Ronnie Mancho
(74) *Attorney, Agent, or Firm* — Mori & Ward, LLP

(57) ABSTRACT

A robot system includes robot, an image capture device, a plurality of illumination devices, and a control device. The robot is configured to perform a predetermined work on a to-be-processed material. The image capture device is configured to capture an image of the to-be-processed material and has a dynamic range. The plurality of illumination devices are configured to illuminate the to-be-processed material. The control device is configured to control at least one illumination device among the plurality of illumination devices to keep an amount of light received by the image capture device within the dynamic range of the image capture device.

9 Claims, 4 Drawing Sheets

(56) References Cited

U.S. PATENT DOCUMENTS

| | | | |
|---|---|---|---|
| 5,500,732 A * | 3/1996 | Ebel et al. | 356/124 |
| 8,582,925 B2 * | 11/2013 | Mirtich et al. | 382/309 |
| 2003/0039388 A1 * | 2/2003 | Ulrich et al. | 382/145 |
| 2013/0044225 A1 | 2/2013 | Jeon | |

FOREIGN PATENT DOCUMENTS

| | | |
|---|---|---|
| JP | 2010-188459 | 9/2010 |
| JP | 2012-011501 | 1/2012 |
| JP | 2012-074785 | 4/2012 |
| JP | 2012-086333 | 5/2012 |
| JP | 2013-041282 | 2/2013 |

OTHER PUBLICATIONS

Extended European Search Report for corresponding EP Application No. 14157432.7-1807, May 4, 2015.

Chinese Office Action for corresponding CN Application No. 201410040757.3, Jun. 1, 2015.

* cited by examiner

ROBOT SYSTEM AND METHOD FOR PRODUCING TO-BE-PROCESSED MATERIAL

CROSS-REFERENCE TO RELATED APPLICATIONS

The present application claims priority under 35 U.S.C. §119 to Japanese Patent Application No. 2013-053291, filed Mar. 15, 2013. The contents of this application are incorporated herein by reference in their entirety.

BACKGROUND

1. Field of the Invention

The present invention relates to a robot system and a method for producing a to-be-processed material.

2. Discussion of the Background

Japanese Unexamined Patent Application Publication No. 2010-188459 and Japanese Unexamined Patent Application Publication No. 2012-011501 each disclose a robot system in which for a robot to hold a to-be-processed material (that is, a workpiece), a camera captures an image of the to-be-processed material to recognize a position and a posture of the to-be-processed material.

SUMMARY

According to one aspect of the present disclosure, a robot system includes robot, an image capture device, a plurality of illumination devices, and a control device. The robot is configured to perform a predetermined work on a to-be-processed material. The image capture device is configured to capture an image of the to-be-processed material. The plurality of illumination devices are configured to illuminate the to-be-processed material. The control device is configured to control at least one illumination device among the plurality of illumination devices to keep an amount of light received by the image capture device within dynamic range of the image capture device.

According to another aspect of the present disclosure, a method is for producing a to-be-processed material using a robot system. The robot system includes a robot, an image capture device, a plurality of illumination devices, and a control device. The robot is configured to perform a predetermined work on the to-be-processed material. The image capture device is configured to capture an image of the to-be-processed material and has a dynamic range. The plurality of illumination devices are configured to illuminate the to-be-processed material. The control device is configured to control at least one illumination device among the plurality of illumination devices to keep an amount of light received by the image capture device within the dynamic range of the image capture device. The method includes transferring the to-be-processed material to an operation area of the robot. The robot is controlled to perform a predetermined operation on the to-be-processed material. The to-be-processed material done with the predetermined operation by the robot is taken out from the operation area of the robot.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
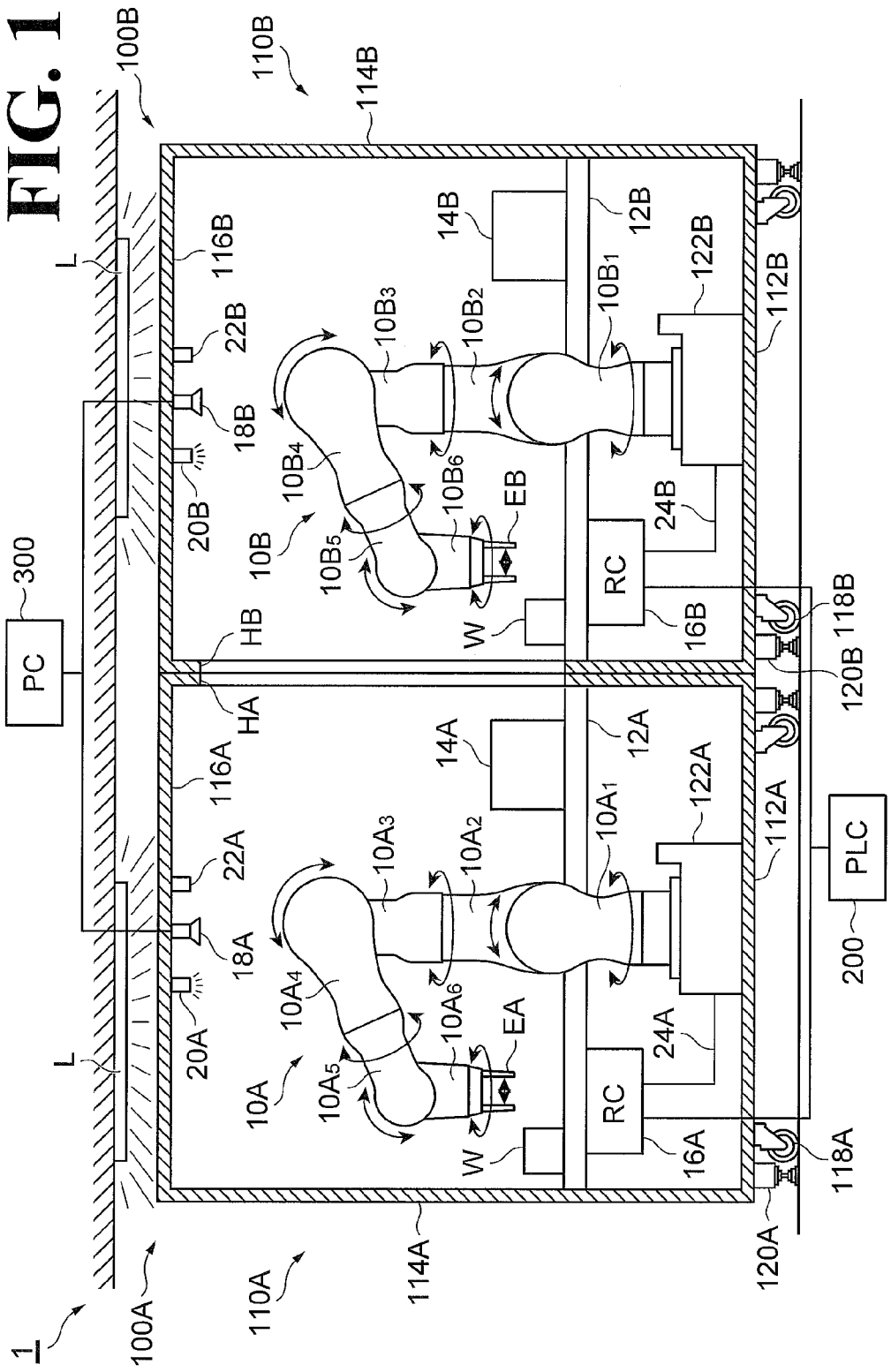
FIG. 1 is a side view of a robot system according to an embodiment.

The embodiments will now be described with reference to the accompanying drawings, wherein like reference numerals designate corresponding or identical elements throughout the various drawings.

In a robot system 1 according to this embodiment, robots 10A and 10B are respectively accommodated in cells 100A and 100B to perform various kinds of work such as processing and assembly on workpieces W (to-be-worked materials). Such a robot system 1 is also referred to as a cell production system. The workpiece W may be any kind of item subject to work such as conveyance and assembly in the robot system 1. The to-be-worked material may be the workpiece W itself, or a product or a semi-processed product made of the workpiece W. The to-be-worked material may also be a product or a semi-processed product formed of a combination of a plurality of parts. The cells 100A and 100B, which respectively accommodate the robots 10A and 10B, are densely arranged in the robot system 1 of this embodiment. This improves the productivity of the workpieces W.

As shown in FIG. 1, the robot system 1 includes the two cells 100A and 100B, a programmable logic controller (PLC) 200, and a personal computer (PC) 300. While in this embodiment the robot system 1 includes the two cells 100A and 100B adjacent to each other, the robot system 1 may include more than two cells. The cells 100A and 100B have approximately the same configurations. Thus, the following description will be regarding the configuration of the cell 100A will be described, with description of the cell 100B omitted.

The cell 100A includes the robot 10A and a casing 110A. The robot 10A performs various kinds of work on the workpiece W. The casing 110A accommodates the robot 10A. The casing 110A includes a bottom wall 112A, side walls 114A, and a top wall 116A. The bottom wall 112A has a rectangular shape and supports the robot 10A. The side walls 114A are upright on the respective sides of the bottom wall 112A. The top wall 116A is disposed on the upper ends of the side walls 114A. The robot 10A is accommodated in an accommodation space defined by the bottom wall 112A, the side walls 114A, and the top wall 116A.

On the lower surface of the bottom wall 112A, casters 118A and stoppers 120A are disposed. The casters 118A make the cell 100A movable, and the stoppers 120A fix the cell 100A. One side wall 114A among the side walls 114A that is in contact with the casing 110B of the cell 100B has a communication hole HA. The communication hole HA communicates with a communication hole HB, which is formed on a side wall 114B. Thus, the accommodation spaces of the casings 110A and 110B communicate with each other through the communication holes HA and HB. The communication holes HA and HB are each provided with a door (not shown) that is openable and closable. When the cells 100A and 100B are not connected to each other, the doors close the communication holes HA and HB.

The side wall 114A on the front side of the cell 100A is where the following operation parts, not shown, are collectively disposed: an opening through which the workpiece W is supplied and taken out; a monitor on which to check the work status of the robot; and various gauges and switches. This ensures that the operator only needs to be positioned on the front side of the cell 11 when operating the robot system 1. The side walls 114A and the top wall 116A each may have a window (not shown) on at least a part of side walls 114A and the top wall 116A. The window is made of a material (such as polycarbonate) superior in transparency and impact resistance, and thus enables the operator to check the work status of the robot 10A in the casing 110A through the window.

The cell 100A incorporates a work table 12A, a tool box 14A, a robot controller (RC) 16A, a camera 18A, an illumination device 20A, and a sensor 22A. The workpiece W is to be placed on the work table 12A. On the work table 12A, the robot 10A performs work on the workpiece W.

The tool box 14A is disposed on the work table 12A and accommodates tools (end effectors) used by the robot 10A to perform work on the workpiece W. The tools include a hand, a driver, a rivet, a drill, and a portable camera. The robot controller 16A is coupled to the robot 10A, the camera 18A, the illumination device 20A, the sensor 22A, and the PLC 200, so as to transmit and receive information to and from these elements. In this embodiment, the robot controller 16A is disposed on the lower surface of the work table 12A and is coupled to the robot 10A through a cable harness 24A. The robot 10A and the robot controller 16A may be coupled to each other wirelessly, or the robot 10A may incorporate the robot controller 16A.

The camera 18A is disposed on the top wall 116A, and mainly captures an image of the work table 12A from above. The illumination device 20A is disposed on the top wall 116A. The illumination device 20A may be any of various types of light sources. Examples include, but are not limited to, a flash that emits a flash of light, a light bulb, a fluorescent light, and an LED that continuously emit a predetermined amount of light. The sensor 22A is disposed adjacent to the camera 18A on the top wall 116A. The sensor 22A detects the intensity (for example, luminosity, brightness, and luminance) of the light received by the camera 18A.

The robot 10A is also referred to as a manipulator. The robot 10A is disposed on the bottom wall 112A of the casing 110A with a base 122A interposed between the robot 10A and the bottom wall 112A, and disposed by a side of the work table 12A. The robot 10A operates based on an operation command output from the robot controller 16A. The operation command is a command as a program to activate the robot or a combination job of programs to activate the robot.

The robot 10A includes first to sixth arms $10A_1$ to $10A_6$. The first arm $10A_1$ is coupled to the base 122A. The first to sixth arms $10A_1$ to $10A_6$ are coupled in series in this order from the based end side (the base 122A). A coupling portion between the base 122A and the first arm $10A_1$, and coupling portions between the adjacent arms $10A_1$ to $10A_6$ function as joints of the robot 10A.

The robot 10A includes a plurality of actuators corresponding to the respective joints. The actuators bring the respective arms $10A_1$ to $10A_6$ into swing movement about the respective joints (see the arrows shown in FIG. 1).

The end effector EA may be a hand removably mounted to the sixth arm $10A_6$, which is at the distal end of the robot 10A. The end effector EA is driven by the actuator incorporated in the sixth arm $10A_6$. When the end effector EA is a hand as shown in FIG. 1, a pair of holder pieces are driven by the actuator to move closer to and away from each other.

In this manner, the hand holds the workpiece W, changes the posture of the workpiece W, and conveys the held workpiece W.

The PLC 200 controls the robots 10A and 10B respectively through the robot controllers 16A and 16B to perform various kinds of work such as assembly, joining, and conveying of the workpiece. The PC 300 processes images captured by the cameras 18A and 18B to recognize the position and posture of the workpiece W.

Figure 2:
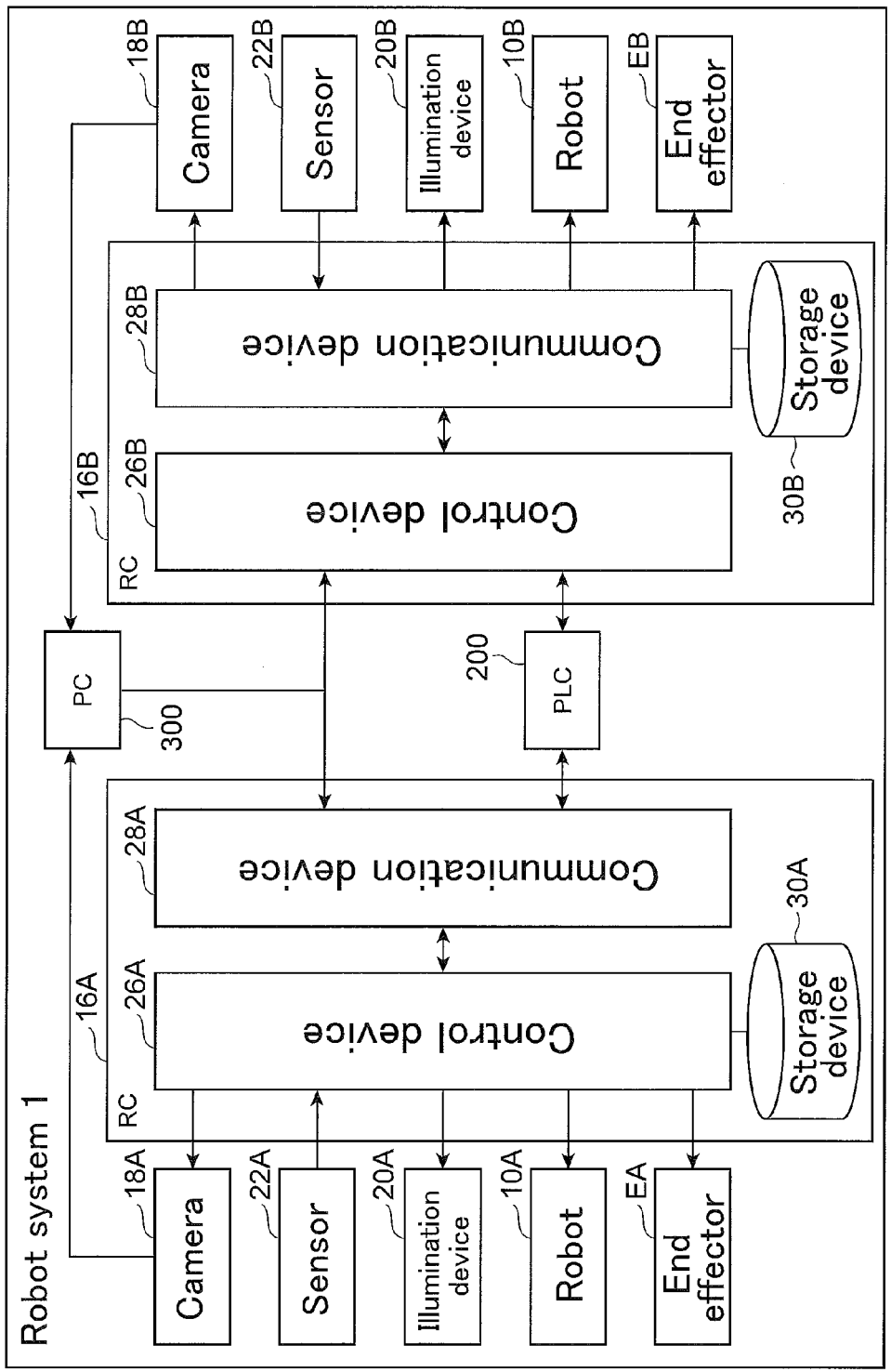
FIG. 2 is a block diagram illustrating the robot system according to the embodiment.

Next, a system configuration of the robot system 1 will be described by referring to FIG. 2. The robot system 1 includes the robot controllers 16A and 16B, the robots 10A and 10B, the end effectors EA and EB, the cameras 18A and 18B, the sensors 22A and 22B, the illumination devices 20A and 20B, the PLC 200, and the PC 300.

The robot controller 16A includes a control device 26A, a communication device 28A, and a storage device 30A. The control device 26A generates an operation command to control the operation of the robot 10A. Specifically, the control device 26A is coupled to the actuators of the robot 10A through the cable harness 24A, and drives the actuators with the operation command, so as to control the operation of the robot 10A.

The control device 26A controls the camera 18A to capture an image of an imaging object (for example, a workpiece W on the work table 12A) that is included in the imaging area of the camera 18A. The control device 26A receives the intensity of light detected by the sensor 22A in the form of a signal. The control device 26A controls the illumination device 20A to provide illumination while the camera 18A is capturing the image. In order to enable the camera 18A to receive desired light, the control device 26A controls the intensity of light emitted from the illumination device 20A based on the signal received from the sensor 22A.

Upon receiving a signal from a detection sensor (not shown) that detects that the cells 100A and 100B are connected to each other, the control device 26A determines that the setting has been changed into a connection mode, in which the plurality of cells 100A and 100B are connected. Then, the control device 26A controls the robots 10A, the end effector EA, the camera 18A, and the illumination device 20A to perform operations under connection mode. Examples of the detection sensor include, but are not limited to, a pressure sensor capable of detecting that the side walls 114A and 114B of the cells have come into contact with each other, a sensor that detects an electrical change caused by the contact between the side walls 114A and 114B of the cells, and a sensor that detects a temperature change caused by the contact between the side walls 114A and 114B of the cells. Alternatively, the control device 26A may use a plug-and-play system to change the setting to connection mode in response to the connection between the cables of the cells 100A and 100B. The control device 26A and the cell 100B may be mutually coupled wirelessly.

When the setting is changed into connection mode, the control device 26A opens the doors that have been respectively closing the communication holes HA and HB. This provides communication between the accommodation space of the casing 110A and the accommodation space of the casing 110B, enabling one robot in one casing to use the inside of the other casing. Thus, the work area of each robot is widened.

The communication device 28A communicates with the control device 26A and the PLC 200 to transmit to the other robot controller 16B (control device 26B) a signal indicating that the setting of the control device 26A has been changed into connection mode. The communication device 28A communicates with the control device 26A and the PLC 200 to receive from the other robot controller 16B a signal indicating that the setting of the control device 26B of the other robot controller 16B has been changed into connection mode. The communication devices 28A and 28B may communicate with each other directly, that is, without the intermediation of the PLC 200, which is an upper device of the robot controllers 16A and 16B. The communication between the communication devices 28A and 28B may be wired or wireless.

The storage device 30A stores a command as a program for operating the robot 10A, the end effector EA, the camera 18A, and the illumination device 20A, and stores a job as a set of such programs. When the control device 26A reads the command or the job from the storage device 30A, then the robot 10A, the end effector EA, the camera 18A, or the illumination device 20A operates in accordance with the read command or job.

Incidentally, the cells 100A and 100B are installed in factories and other institutions that contain various light sources including natural light. For example, in FIG. 1, fluorescent lights L are disposed on the ceiling. In addition to these light sources, the adjacent cells 100A and 100B respectively include the illumination devices 20A and 20B. If the illumination devices 20A and 20B spark at the same time, the cameras 18A and 18B each may receive an amount of light that exceeds the dynamic ranges of the respective cameras 18A and 18B, resulting in an overexposure. The overexposure causes an area marked out by white to occur on the captured image. This can inhibit accurate recognition of the workpiece W. In view of this, the controllers 26A and 26B respectively control the illumination devices 20A and 20B in the manner described below.

When the settings of the controllers 26A and 26B are changed into connection mode, the controller 26A and/or the controller 26B control at least one of the illumination devices 20A and 20B to keep the amount of light received by the camera 18A and/or the camera 18B within the dynamic range of the camera 18A and/or the camera 18B when the cameras 18A and 18B each capture an image. Specifically, the controller 26A and/or the controller 26B may adjust the intensity of light emitted from at least one of the illumination devices 20A and 20B, so as to keep the amount of light received by the camera 18A and/or the camera 18B within the dynamic range of the camera 18A and/or the camera 18B when the cameras 18A and 18B each capture an image. Also, the controllers 26A and 26B may respectively control the illumination devices 20A and 20B to operate at different timings, so as to keep the amount of light received by each of the cameras 18A and 18B within the dynamic ranges of the respective cameras 18A and 18B when the cameras 18A and 18B each capture an image. Also, the controller 26A and/or the controller 26B may control the emission direction of light emitted from at least one of the illumination devices 20A and 20B (for example, to orient the illumination devices 20A and 20B in mutually opposite directions), so as to keep the amount of light received by each of the cameras 18A and 18B within the dynamic ranges of the respective cameras 18A and 18B when the cameras 18A and 18B each capture an image. The controller 26A and/or the controller 26B may control at least one of the illumination devices 20A and 20B to operate in the above-described manner in accordance with the intensity of light detected by the sensor 22A and/or the sensor 22B.

For example, the workpiece W is conveyed into the cell 100A. The workpiece W is then placed on the work table 12A. The camera 18A captures an image of the workpiece W based on an instruction from the control device 26A. After the camera 18A has captured an image of the workpiece W, data of the image is transmitted to the PC 300. The PC 300 processes the image data to recognize the position and posture of the workpiece W imaged by the camera 18A. Then, the PC 300 transmits the recognized position and posture of the workpiece W to the robot controller 16A (communication device 28A). Based on the data on the position and posture of the workpiece W, the control device 26A controls the robot 10A and the end effector EA to perform a predetermined kind of work on the workpiece W. When the work is complete, the workpiece W is taken out of the cell 100A (for example, to the cell 100B). Thus, the workpiece W is produced.

In the above-described embodiment, the controller 26A and/or the controller 26B control at least one of the illumination devices 20A and 20B to keep the amount of light received by the camera 18A and/or the camera 18B within the dynamic range of the camera 18A and/or the camera 18B when the cameras 18A and 18B each capture an image. This minimizes the possibility of an overexposure occurring on the images captured by the cameras 18A and 18B. This, as a result, ensures accurate detection of the position and posture of the workpiece W. Additionally, it is not necessary to enclose with a blackout curtain the areas where the cameras 18A and 18B capture an image of the workpiece. This ensures a widened operable range for each of the robots 10A and 10B.

In this embodiment, the controller 26A and/or the controller 26B control at least one of the illumination devices 20A and 20B in accordance with the intensity of light detected by the sensor 22A and/or the sensor 22B. This ensures automatic adjustment of the intensity of light and the timing at which each of the illumination devices 20A and 20B emits the light in accordance with the brightness of the environment in which the cells 100A and 100B are disposed.

It is noted that the above-described embodiment is provided for exemplary purposes only and is not intended in a limiting sense. For example, the controllers 26A and 26B may control the intensity of light and the timing at which light sources (for example, the fluorescent lights L) disposed outside the cells 100A and 100B emit the light. This control may be additional to the control of the illumination devices 20A and 20B respectively of the cells 100A and 100B, or replaced by the control of the illumination devices 20A and 20B respectively of the cells 100A and 100B.

The controllers 26A and 26B may also control shutter speeds of the cameras 18A and 18B. This control may be additional to the control of the illumination devices 20A and 20B respectively of the cells 100A and 100B, or replaced by the control of the illumination devices 20A and 20B respectively of the cells 100A and 100B.

The controllers 26A and 26B may automatically cover the image capture area of each of the cameras 18A and 18B with a blackout curtain when the cameras 18A and 18B capture an image, and automatically uncover the blackout curtain after the cameras 18A and 18B each have captured an image. This control may be additional to the control of the illumination devices 20A and 20B respectively of the cells 100A and 100B, or replaced by the control of the illumination devices 20A and 20B respectively of the cells 100A and 100B.

Figure 3:
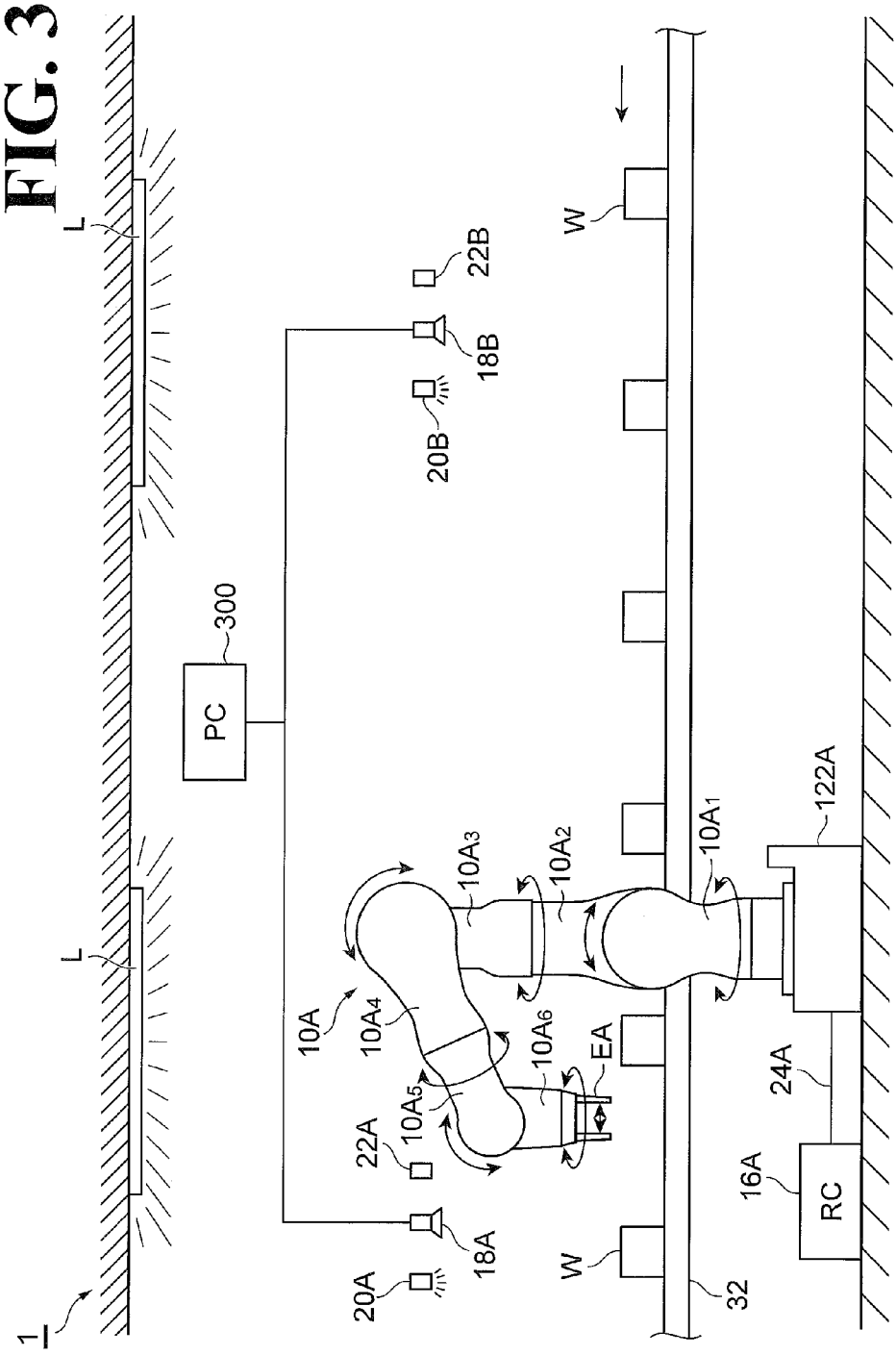
FIG. 3 is a side view of another robot system according to the embodiment.
Figure 4:
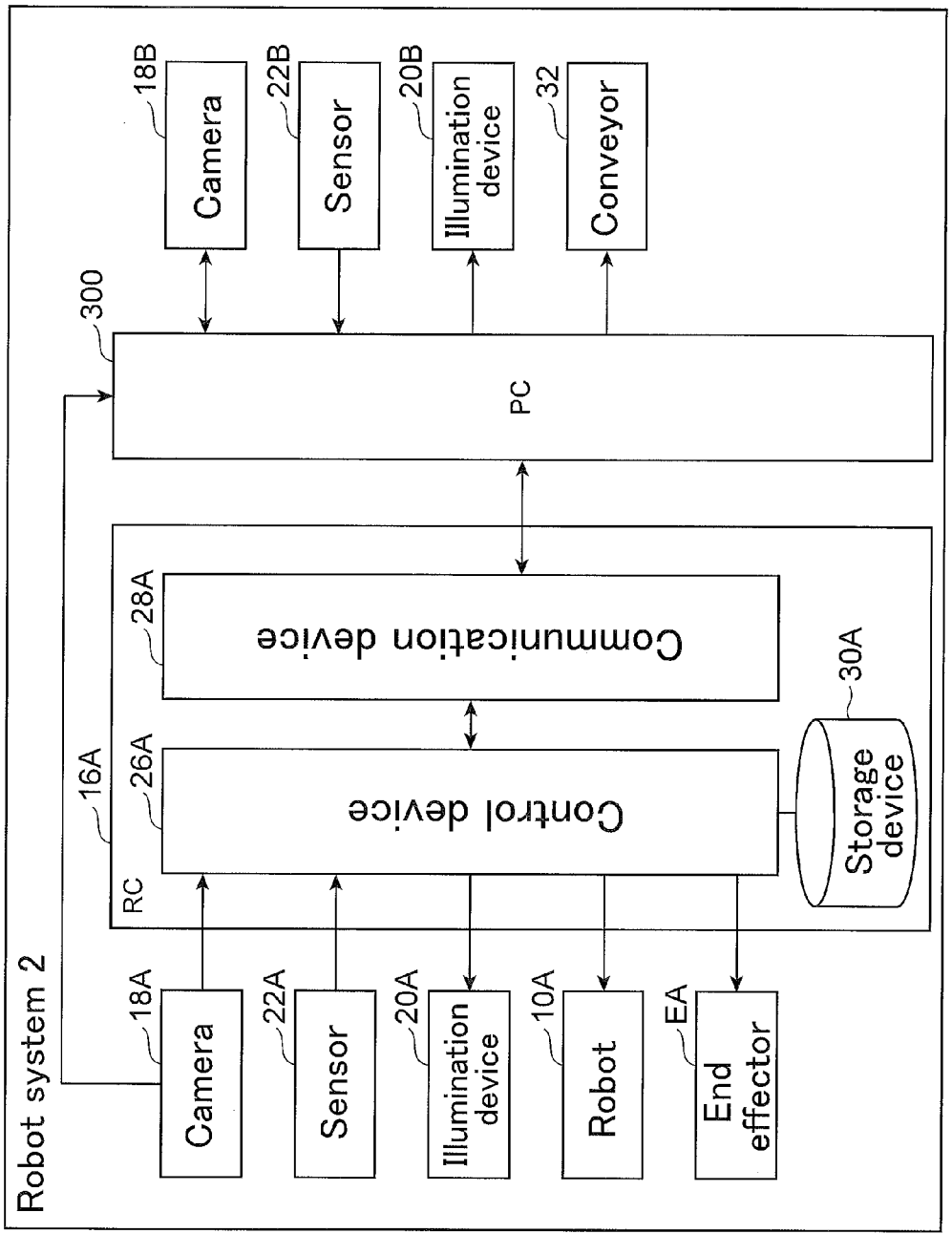
FIG. 4 is a block diagram illustrating still another robot system according to the embodiment.

In the above-described embodiment, the robot system 1 has been illustrated as a cell production system including the cells 100A and 100B. The robot system 1 is also applicable to any robot system other than the cell production system. Specifically, as shown in FIGS. 3 and 4, the robot system 2 includes a conveyor 32, a robot 10A, cameras 18A and 18B, illumination devices 20A and 20B, and sensors 22A and 22B. The conveyor 32 transfers at least one workpiece W in a predetermined direction. The robot 10A is disposed by a side of the conveyor 32.

In the robot system 2, the camera 18A, the illumination device 20A, and the sensor 22A are used to recognize the position and posture of the workpiece W while the robot 10A is working on the workpiece W. In the robot system 2, the camera 18B, the illumination device 20B, and the sensor 22B are disposed on an upstream side of the camera 18A, the illumination device 20A, the sensor 22A, and the robot 10A in the direction in which the workpiece W is transferred by the conveyor 32. The camera 18B, the illumination device 20B, and the sensor 22B are used, for example, to inspect the external appearance of the workpiece W. The camera 18B, the illumination device 20B, the sensor 22B, and the conveyor 32 are coupled to the computer 300.

The computer 300 controls operations of the camera 18B, the illumination device 20B, and the conveyor 32. The computer 300 receives the intensity of light detected by the sensor 22B in the form of a signal.

Based on an instruction of the computer 300, the camera 18B captures an image of the workpiece W. Then, image data of the captured image is transmitted to the computer 300. The computer 300 processes the image data to inspect whether the workpiece W includes a defect (for example, chipping, breaking, and cracks). As a result of the appearance inspection by the computer 300, when the computer 300 determines that the workpiece W is non-defective, the computer 300 transmits the determination result to the robot controller 16A. The control device 26A receives the determination result through the communication device 28A, and then controls the robot 10A and/or the end effector EA to perform work on the workpiece W determined as non-defective when the workpiece W is transferred to the robot 10A by the conveyor 32.

Meanwhile, as the result of the appearance inspection by the computer 300, when the computer 300 determines that the workpiece W is defective, the computer 300 transmits the determination result to the robot controller 16A. The control device 26A receives the determination result through the communication device 28A, and controls the robot 10A and/or the end effector EA not to perform work on the workpiece W determined as defective, even though the workpiece W is transferred to the robot 10A by the conveyor 32.

The robot system 2 is also installed in factories and other institutions that contain various light sources including natural light. For example, in FIG. 3, fluorescent lights L are disposed on the ceiling. In addition to these light sources, the illumination devices 20A and 20B are disposed on the upstream side and the downstream side of the conveyor 32. If the illumination devices 20A and 20B spark at the same time, the cameras 18A and 18B each may receive an amount of light that exceeds the dynamic ranges of the respective cameras 18A and 18B, resulting in an overexposure.

In view of this, in the robot system 2, the control device 26A and the computer 300 control at least one of the illumination devices 20A and 20B to keep the amount of light received by the camera 18A and/or the camera 18B within the dynamic range of the camera 18A and/or the camera 18B when the cameras 18A and 18B each capture an image. This minimizes the possibility of an overexposure occurring on the images captured by the cameras 18A and 18B. This, as a result, ensures accurate detection of the position and posture of the workpiece W, also in the robot system 2.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
   a first robot and a second robot each configured to perform a predetermined work on a to-be-processed material;
   a first image capture device and a second image capture device each configured to capture an image of the to-be-processed material;
   a first illumination device and a second illumination device each configured to illuminate the to-be-processed material;
   a control device configured to control the first illumination device and the second illumination device; and
   a first casing accommodating the first robot, the first image capture device, and first illumination device; and
   a second casing accommodating the second robot, the second image capture device, and second illumination device,
   wherein, when the first casing comes into contact with the second casing, the control device controls at least one illumination device of the first illumination device and the second illumination device to keep an amount of light received by the first image capture device and the second image capture device within dynamic range of the first image capture device and the second image capture device.

2. The robot system according to claim 1, wherein the control device is configured to adjust an intensity of light emitted from the at least one illumination device.

3. The robot system according to claim 1, wherein the control device is configured to control the first illumination device and the second illumination device to operate at different timings.

4. The robot system according to claim 1, wherein the control device is configured to control an emission direction of light emitted from the at least one illumination device.

5. The robot system according to claim 1, further comprising a sensor configured to detect an intensity of light,
   wherein the control device is configured to control the at least one illumination device in accordance with the intensity of the light detected by the sensor.

6. A method for producing a to-be-processed material using a robot system, the robot system comprising:
   a first robot and a second robot each configured to perform a predetermined work on the to-be-processed material;
   a first image capture device and a second image capture device each configured to capture an image of the to-be-processed material and comprising a dynamic range;
   a first illumination device and a second illumination device each configured to illuminate the to-be-processed material;
   a control device configured to control the first illumination device and the second illumination device;
   a first casing accommodating the first robot, the first image capture device, and first illumination device; and
   a second casing accommodating the second robot, the second image capture device, and second illumination device,
   wherein, when the first casing comes into contact with the second casing, the control device controls at least one illumination device of the first illumination device and the second illumination device to keep an amount of light received by the first image capture device and the second image capture device within dynamic range of the first image capture device and the second image capture device,
   the method comprising:
   transferring the to-be-processed material to an operation area of a respective robot of the first robot and the second robot;
   controlling the respective robot to perform a predetermined operation on the to-be-processed material; and taking out the to-be-processed material done with the predetermined operation by the respective robot from the operation area of the respective robot.

7. The robot system according to claim 2, further comprising a sensor configured to detect an intensity of light, wherein the control device is configured to control the at least one illumination device in accordance with the intensity of the light detected by the sensor.

8. The robot system according to claim 3, further comprising a sensor configured to detect an intensity of light, wherein the control device is configured to control the at least one illumination device in accordance with the intensity of the light detected by the sensor.

9. The robot system according to claim 4, further comprising a sensor configured to detect an intensity of light, wherein the control device is configured to control the at least one illumination device in accordance with the intensity of the light detected by the sensor.

* * * * *